United States Patent
Shen et al.

(10) Patent No.: US 11,157,030 B2
(45) Date of Patent: Oct. 26, 2021

(54) METHOD OF REGULATING OPERATIONAL MODES IN ENERGY DISTRIBUTION SYSTEMS

(71) Applicant: Persagy Technology CO., LTD., Beijing (CN)

(72) Inventors: Qi Shen, Beijing (CN); Jiang Jiang, Beijing (CN); Hongying Yang, Beijing (CN)

(73) Assignee: Persagy Technology CO., LTD., Beijing (CN)

( * ) Notice: Subject to any disclaimer, the term of this patent is extended or adjusted under 35 U.S.C. 154(b) by 139 days.

(21) Appl. No.: 16/703,275

(22) Filed: Dec. 4, 2019

(65) Prior Publication Data

US 2020/0192410 A1 Jun. 18, 2020

(30) Foreign Application Priority Data

Dec. 12, 2018 (CN) .......................... 201811520703.1

(51) Int. Cl.
*G05F 1/66* (2006.01)
*G06Q 50/06* (2012.01)
*H02J 3/32* (2006.01)

(52) U.S. Cl.
CPC ............... *G05F 1/66* (2013.01); *G06Q 50/06* (2013.01); *H02J 3/32* (2013.01)

(58) Field of Classification Search
None
See application file for complete search history.

(56) References Cited

U.S. PATENT DOCUMENTS

| | | | | | |
|---|---|---|---|---|---|
| 4,839,819 | A | * | 6/1989 | Begin | .................. G01R 21/133 318/650 |
| 4,989,155 | A | * | 1/1991 | Begin | .................. G01R 21/133 324/142 |

(Continued)

FOREIGN PATENT DOCUMENTS

| | | | | | |
|---|---|---|---|---|---|
| CN | 205017111 | U | * | 2/2016 | .............. H02J 13/00 |
| CN | 105576698 | A | * | 5/2016 | ................ H02J 3/38 |

(Continued)

OTHER PUBLICATIONS

Zheng, et al., "Optimal integration of mobile battery energy storage in distribution system with renewables", Feb. 2015, J. Mod. Power Syst. Clean Energy (2015) 3(4):589-596. (Year: 2015).*

(Continued)

*Primary Examiner* — Mohammad Ali
*Assistant Examiner* — Kelvin Booker
(74) *Attorney, Agent, or Firm* — Andrus Intellectual Property Law, LLP

(57) ABSTRACT

A distributed energy system, an energy intelligent terminal, and a control method thereof are disclosed. It determines an error between the sum of initial random external input power that can be assumed by each of all the energy intelligent terminals and target power, updates the alternative operation mode for each energy intelligent terminal in an iterative manner when the error satisfies an iteration start condition until an iteration exit condition being satisfied, and determines the alternative operation mode for each energy intelligent terminal in the final iteration period as the operation mode for next duty cycle so as to regulate operation mode of the distributed energy system in real time according to the target power and energy consumption power of load to which each energy intelligent terminal corresponds. The distributed energy system has ad hoc network capability (Continued)

with the characteristics of fast deployment and plug and play terminals.

19 Claims, 6 Drawing Sheets

(56) References Cited

U.S. PATENT DOCUMENTS

| | | | | |
|---|---|---|---|---|
| 9,088,160 | B2* | 7/2015 | Yang | G05F 1/66 |
| 2008/0172312 | A1* | 7/2008 | Synesiou | G06Q 20/102 |
| | | | | 705/34 |
| 2008/0281663 | A1* | 11/2008 | Hakim | H02J 3/46 |
| | | | | 705/7.25 |
| 2010/0179704 | A1* | 7/2010 | Ozog | H02J 13/0006 |
| | | | | 700/291 |
| 2011/0231028 | A1* | 9/2011 | Ozog | G06Q 50/06 |
| | | | | 700/291 |
| 2012/0060044 | A1* | 3/2012 | Jonsson | H02J 13/0005 |
| | | | | 713/340 |
| 2012/0080949 | A1* | 4/2012 | Gelonese | H02J 3/14 |
| | | | | 307/31 |
| 2013/0099565 | A1* | 4/2013 | Sachs | H02J 3/382 |
| | | | | 307/25 |
| 2013/0345888 | A1* | 12/2013 | Forbes, Jr. | H04L 67/10 |
| | | | | 700/291 |
| 2013/0346768 | A1* | 12/2013 | Forbes, Jr. | G05F 1/66 |
| | | | | 713/310 |
| 2014/0018969 | A1* | 1/2014 | Forbes, Jr. | H02J 3/32 |
| | | | | 700/295 |
| 2014/0281598 | A1* | 9/2014 | Nasta | H05K 7/1457 |
| | | | | 713/310 |
| 2015/0318705 | A1* | 11/2015 | Lucas | H02J 3/386 |
| | | | | 307/129 |
| 2017/0133843 | A1* | 5/2017 | McNeill-McCallum | |
| | | | | H02J 3/00 |
| 2017/0149255 | A1* | 5/2017 | Garcia-Acosta | H02J 7/007 |
| 2017/0214246 | A1* | 7/2017 | Wang | H02J 3/322 |
| 2020/0195010 | A1* | 6/2020 | Shen | H02J 3/32 |
| 2021/0013735 | A1* | 1/2021 | Pachoud | H02J 9/068 |

FOREIGN PATENT DOCUMENTS

| | | | | |
|---|---|---|---|---|
| CN | 104104118 | B * | 12/2016 | H02J 7/00 |
| CN | 105281435 | B * | 9/2017 | H02J 13/00 |
| CN | 208174746 | U | 11/2018 | |
| CN | 109787275 | A | 5/2019 | |
| CN | 209000209 | U | 6/2019 | |
| CN | 209229949 | U | 8/2019 | |

OTHER PUBLICATIONS

Zhanguo et al., "Discussion on intelligent operation and maintenance of large distributed master station system", 2017, CIEEC2017—International Electrical and Energy Conference. (Year: 2017).*
Nguyen et al., "Agent Based Restoration With Distributed Energy Storage Support in Smart Grids", Dec. 2010, IEEE Transactions on Smart Grid, vol. 3, No. 2, Jun. 2012. (Year: 2010).*
Anvari-Moghaddam et al., "A multi-agent based energy management solution for integrated buildings and microgrid system", Jan. 2017, Applied Energy 203 (2017) 41-56. (Year: 2017).*
Radhakrishnan et al., "A multi-agent based distributed energy management scheme for smart grid applications", Jul. 2015, Energy 103 (2016). (Year: 2015).*
Leonardi et al., "Towards the Smart Grid: Substation Automation Architecture and Technologies", Apr. 2014, Hindawi Publishing Corporation Advances in Electrical Engineering vol. 2014, Article ID 896296, 13 pages. (Year: 2014).*
Islam et al., "An Efficient Smart Solar Charge Controller for Standalone Energy Systems", Sep. 2015, 2015 International Conference on Electrical Drives and Power Electronics (EDPE), The High Tatras, Sep. 21-23, 2015. (Year: 2015).*
Hosseinzadeh et al., "Fault-Tolerant Supervisory Controller for a Hybrid AC/DC Micro-Grid", Jun. 2016, IEEE Transactions on Smart Grid, vol. 9, No. 4, Jul. 2018. (Year: 2016).*
Habib et al., "A Review of Communication Failure Impacts on Adaptive Microgrid Protection Schemes and the Use of Energy Storage as a Contingency", Jul. 2017, IEEE Transactions on Industry Applications, vol. 54, No. 2, Mar./Apr. 2018. (Year: 2017).*

* cited by examiner

METHOD OF REGULATING OPERATIONAL MODES IN ENERGY DISTRIBUTION SYSTEMS

CROSS REFERENCE TO RELATED APPLICATIONS

The present application claims the priority of the Chinese application No. 201811520703.1 with the title of "DISTRIBUTED ENERGY SYSTEM, ENERGY INTELLIGENT TERMINAL AND CONTROL METHOD THEREOF" filed on Dec. 12, 2018, the entire contents of which are incorporated herein by reference.

TECHNICAL FIELD

The present disclosure relates to the field of electric power supply technology, and more particular to a distributed energy system, an energy intelligent terminal, and a control method thereof.

BACKGROUND

With the ever-growing demand for energy and increasing pressure for environmental protection, distributed energy system, as an open energy system, is a powerful complement to traditional centralized energy supply systems, which not only includes multiple energy inputs but also can satisfy a variety of energy needs of users simultaneously. However, the large number of distributed energy system being connected to the power grid has brought about unignored impacts. Therefore, how to make the distributed energy system realize the absorption of energy in situ and improve the efficiency and stability of distributed energy system is a problem to be solved imperatively.

SUMMARY

In view of this, the embodiments of the present disclosure provide a distributed energy system, an energy intelligent terminal and a control method thereof so as to regulate operation mode of the distributed energy system in real time according to target power and energy consumption power of load to which each energy intelligent terminal corresponds. The regulating method is simple and can improve the efficiency and stability of the distributed energy system.

According to a first aspect of the present disclosure, it provides a control method for a distributed energy system, wherein the distributed energy system comprises multiple energy intelligent terminals connected through a network, and the energy intelligent terminal supplies power to a corresponding load based on a battery or an external input and/or charges the battery through the external input, the energy intelligent terminal has a corresponding set of alternative operation modes in different operation states, and different alternative operation modes in the set of alternative operation modes assume corresponding external input power, the control method comprises:

determining an energy intelligent terminal as a master node and other energy intelligent terminals as slave nodes;

calculating, by the master node, a sum of initial random external input power that can be assumed by each of all the energy intelligent terminals, and the initial random external input power being obtained from initial alternative operation mode randomly selected by each energy intelligent terminal, wherein each energy intelligent terminal randomly selects the initial alternative operation mode from the set of alternative operation modes to which its current state corresponds according to an initial mode probability distribution;

updating, in response to the error between the sum of the initial random external input power and target power satisfying an iteration start condition, the alternative operation mode for each energy intelligent terminal in an iterative manner until an iteration exit condition being satisfied, wherein the iteration exit condition comprises the error between the sum of the initial random external input power and the target power in the iteration period being less than or equal to an error threshold; and determining the alternative operation mode for each energy intelligent terminal in the final iteration period as the operation mode for next duty cycle, wherein, in each iteration period, the mode probability distribution to which each energy intelligent terminal corresponds is regulated and the alternative operation mode is reselected based on the regulated mode probability distribution.

In one embodiment, the control method further comprises:

calculating, by the master bode, a sum of maximal external input power that can be assumed by each of all the energy intelligent terminals; and determining, in response to the sum of maximal external input power being less than or equal to the target power, the alternative operation mode for each energy intelligent terminal corresponding to the maximal external input power as the operation mode for the next duty cycle.

In one embodiment, the control method further comprises:

calculating, by the master node, a sum of minimal external input power that can be assumed by each of all the energy intelligent terminals; and determining, in response to the sum of minimal external input power being larger than or equal to the target power, the alternative operation mode for each energy intelligent terminal corresponding to the minimal external input power as the operation mode for the next duty cycle.

In one embodiment, the initial mode probability distribution for each energy intelligent terminal is determined by the number of items in the corresponding set of alternative operation modes; and wherein the initial mode probability for each alternative operation mode in the set of alternative operation modes is identical.

In one embodiment, wherein, in each iteration period, regulating the mode probability distribution to which each energy intelligent terminal corresponds comprises:

determining, by the master node, a probability indicator according to random power difference in current iteration period and random power difference in previous iteration period, and sending the probability indicator to each energy intelligent terminal, wherein the random power difference is the error between the sum of the random external input power and the target power;

calculating, by each energy intelligent terminal in response to the probability indicator being of a first state, a probability for the alternative operation mode to which the current iteration period corresponds and probabilities for other alternative operation modes in the corresponding set of alternative operation modes according to a predetermined algorithm to regulate the mode probability distribution to which each energy intelligent terminal corresponds; and calculating, by each energy intelligent terminal in response to the probability indicator being of a second state, a probability for the alternative operation mode to which the previous iteration period corresponds and probabilities for other alternative operation modes in the corresponding set of alternative operation modes according to a predetermined algorithm to regulate the mode probability distribution to which each energy intelligent terminal corresponds.

In one embodiment, the iteration exit condition further comprises that the number of iterations reaches an iteration number threshold.

In one embodiment, calculating, by the master node, a sum of initial random external input power that can be assumed by each of all the energy intelligent terminals comprises:

initiating and establishing, by the master node, a spanning tree that connects all the slave nodes in the distributed energy system; and receiving, by the master node, a sum of the initial random external input power that can be assumed by subtrees to which each energy intelligent terminal gradually reports according to the connection relationship of the spanning tree so as to calculate the sum of initial random external input power that can be assumed by each of all the energy intelligent terminals.

According to a second aspect of the present disclosure, it provides a control method for an energy intelligent terminal, wherein the energy intelligent terminal supplies power to a corresponding load based on a battery or an external input and/or charges the battery through the external input, the energy intelligent terminal has a corresponding set of alternative operation modes in different operation states, and different alternative operation modes in the set of alternative operation modes assume corresponding external input power, the control method comprises:

calculating, in response to being determined as a master node, a sum of initial random external input power that can be assumed by each of all energy intelligent terminals in a distributed energy system, and the initial random external input power being obtained from initial alternative operation mode randomly selected by each energy intelligent terminal, wherein each energy intelligent terminal randomly selects the initial alternative operation mode from the set of alternative operation modes to which its current state corresponds according to an initial mode probability distribution;

controlling, in response to the error between the sum of initial random external input power and target power satisfying an iteration start condition, each energy intelligent terminal to update the corresponding alternative operation mode in an iterative manner until an iteration exit condition being satisfied, wherein the iteration exit condition comprises the error between the sum of the random external input power and the target power in the iteration period being less than an error threshold; and sending an instruction that the iteration is exited to each energy intelligent terminal so as to make each energy intelligent terminal determine the alternative operation mode to which the final iteration period corresponds as the operation mode for next duty cycle, wherein, in each iteration period, each energy intelligent terminal is controlled to regulate the corresponding mode probability distribution and the alternative operation mode is reselected based on the regulated mode probability distribution.

In one embodiment, the control method further comprises:

calculating, in response to being determined as the master node, a sum of maximal external input power that can be assumed by each of all the energy intelligent terminals in the distributed energy system; and sending an instruction that the operation is carried out with the maximal external input power in response to the sum of maximal external input power being less than or equal to the target power.

In one embodiment, the control method further comprises:

calculating, in response to being determined as the master node, a sum of minimal external input power that can be assumed by each of all the energy intelligent terminals in the distributed energy system; and sending an instruction that the operation is carried out with the minimal external input power in response to the sum of minimal external input power being larger than or equal to the target power.

In one embodiment, the initial mode probability distribution for each energy intelligent terminal is determined by the number of items in the corresponding set of alternative operation modes; and wherein the initial mode probability for each alternative operation mode in the set of alternative operation modes is identical.

In one embodiment, wherein, in each iteration period, controlling each energy intelligent terminal to regulate the corresponding mode probability distribution comprises:

determining a probability indicator according to random power difference in current iteration period and random power difference in previous iteration period, and sending the probability indicator to control each energy intelligent terminal to regulate the corresponding mode probability distribution according to the probability indicator, wherein the random power difference is the error between the sum of the random external input power and the target power.

In one embodiment, the iteration exit condition further comprises that the number of iterations reaches an iteration number threshold.

In one embodiment, calculating, in response to being determined as the master node, a sum of initial random external input power that can be assumed by each of all the energy intelligent terminals in the distributed energy system comprises:

initiating and establishing, in response to being determined as the master node, a spanning tree that connects other energy intelligent terminals in the distributed energy system; and receiving a sum of the initial random external input power that can be assumed by subtrees to which each energy intelligent terminal gradually reports according to the connection relationship of the spanning tree so as to calculate the sum of the initial random external input power of each of all the energy intelligent terminals in the distributed energy system.

According to a third aspect of the present disclosure, it provides a control method for an energy intelligent terminal, wherein the energy intelligent terminal supplies power to a corresponding load based on a battery or an external input and/or charges the battery through the external input, the energy intelligent terminal has a corresponding set of alternative operation modes in different operation states, and different alternative operation modes in the set of alternative operation modes assume corresponding external input power, the control method comprises:

sending, in response to being determined as a slave node, initial random external input power that can be assumed, and the initial random external input power being obtained from initial alternative operation mode randomly selected by the energy intelligent terminal, wherein the energy intelligent terminal randomly selects the initial alternative operation mode from the set of alternative operation modes to which its current state corresponds according to an initial mode probability distribution;

updating the alternative operation mode in an iterative manner; and determining, in response to an instruction that the iteration is exited, the alternative operation mode to which the final iteration period corresponds as the operation mode for next duty cycle;

wherein in each iteration period, the corresponding mode probability distribution is regulated and the alternative operation mode is reselected based on the regulated mode probability distribution.

In one embodiment, the control method further comprises:

sending, in response to being determined as the slave node, maximal external input power that can be assumed; and determining, in response to an instruction that the operation is carried out with the maximal external input power, the alternative operation mode corresponding to the maximal external input power as the operation mode for the next duty cycle.

In one embodiment, the control method further comprises:

sending, in response to being determined as the slave node, minimal external input power that can be assumed; and determining, in response to an instruction that the operation is carried out with the minimal external input power, the alternative operation mode corresponding to the minimal external input power as the operation mode for the next duty cycle.

In one embodiment, the initial mode probability distribution for the energy intelligent terminal is determined by the number of items in the corresponding set of alternative operation modes; and wherein the initial mode probability for each alternative operation mode in the set of alternative operation modes is identical.

In one embodiment, wherein, in each iteration period, regulating the corresponding mode probability distribution comprises:

calculating, in response to a probability indicator being of a first state, a probability for the alternative operation mode to which current iteration period corresponds and probabilities for other alternative operation modes in the corresponding set of alternative operation modes according to a predetermined algorithm to regulate the corresponding mode probability distribution; and calculating, in response to the probability indicator being of a second state, a probability for the alternative operation mode to which previous iteration period corresponds and probabilities for other alternative operation modes in the corresponding set of alternative operation modes according to a predetermined algorithm to regulate the corresponding mode probability distribution.

According to a fourth aspect of the present disclosure, it provides an energy intelligent terminal comprising a memory for storing one or more computer program instructions and a processor, wherein, the one or more computer program instructions are executed by the processor to implement the method as described in the second aspect of the present disclosure.

According to a fifth aspect of the present disclosure, it provides an energy intelligent terminal comprising a memory for storing one or more computer program instructions and a processor, wherein, the one or more computer program instructions are executed by the processor to implement the method as described in the third aspect of the present disclosure.

According to a sixth aspect of the present disclosure, it provides a distributed energy system comprising a plurality of energy intelligent terminals, the energy intelligent terminal comprising a memory for storing one or more computer program instructions and a processor, wherein, the one or more computer program instructions are executed by the processor to implement the method as described in the second aspect of the present disclosure; or the one or more computer program instructions are executed by the processor to implement the method as described in the third aspect of the present disclosure.

According to the technical solutions of the embodiments of the present disclosure, it determines the error between a sum of initial random external input power that can be assumed by each of all the energy intelligent terminals and target power, updates the alternative operation mode for each energy intelligent terminal in an iterative manner when the error satisfies an iteration start condition until an iteration exit condition being satisfied, and determines the alternative operation mode for each energy intelligent terminal in the final iteration period as the operation mode for next duty cycle so as to regulate operation mode of the distributed energy system in real time according to the target power and energy consumption power of load to which each energy intelligent terminal corresponds. The regulating method is simple and improves the efficient and stability of the distributed energy system. Moreover, the distributed energy system according to the embodiments of the present disclosure has ad hoc network capability with the characteristics of fast deployment and plug and play terminals.

BRIEF DESCRIPTION OF THE DRAWINGS

The above and other objects, features and advantages of the present disclosure will become more apparent from the following description of the embodiments of the present disclosure with reference to the accompanying drawings in which.

DETAILED DESCRIPTION

The present disclosure will be described below with reference to the embodiments, but the present disclosure is not merely limited to these embodiments. Some specific details are concretely described in the following description of the details of the present disclosure. The present disclosure can be understood by those skilled in the art without those descriptions of the details. In order to avoid obscuring the essence of the present disclosure, well-known methods, processes, procedures, components and circuits are not described in detail.

In addition, it will be understood by those ordinary skilled in the art that the drawings provided herein are for illustrative purpose and are not necessarily drawn to scale.

Unless the context clearly requires, otherwise, the words "comprising", "including" and the like in the entire specification and claims should be construed as the meaning of inclusion rather than the meaning of exclusion or exhaustion, that is, the meaning of "including but not limited to".

In the description of the present disclosure, it needs to be understood that the terms "first", "second" and the like are for illustrative purposes only and should not to be construed as indicating or implying relative importance. In addition, in the description of the present disclosure, the meaning of "a plurality of" means two or more, unless otherwise specified.

Figure 1:
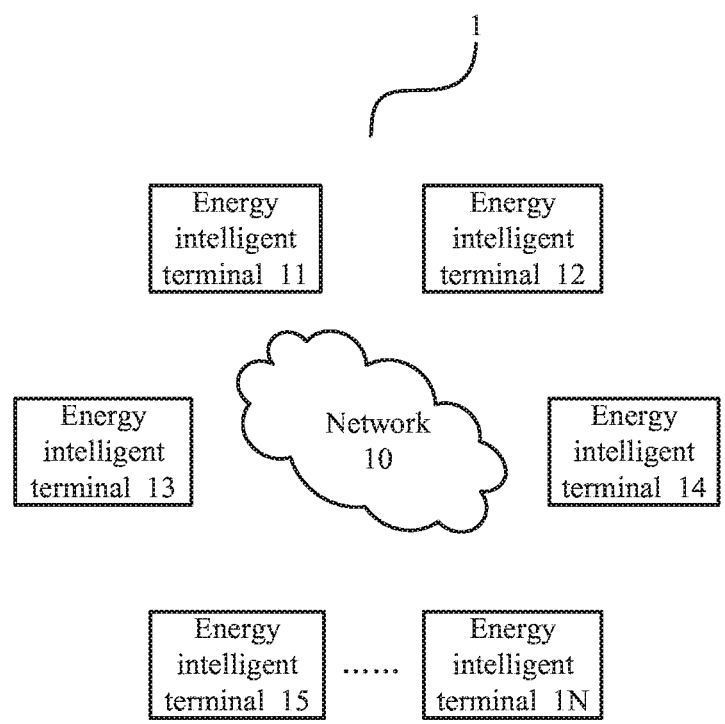
FIG. 1 is a schematic diagram of a distributed energy system according to an embodiment of the present disclosure.

FIG. 1 is a schematic diagram of a distributed energy system according to an embodiment of the present disclosure. As shown in FIG. 1, the distributed energy system 1 includes energy intelligent terminals 11-1N that are networked and communicate through a network 10. Each energy intelligent terminal supplies power to a corresponding load based on a battery or an external input and/or charges the battery through the external input. Each energy intelligent terminal has an ad hoc network capability and can control its own operation mode. Each energy intelligent terminal has a corresponding set of alternative operation modes in different operation states. Different alternative operation modes in the set of alternative operation modes assume corresponding external input power. Among them, the external input can be a public power grid or a power generation device and so on.

Figure 2:
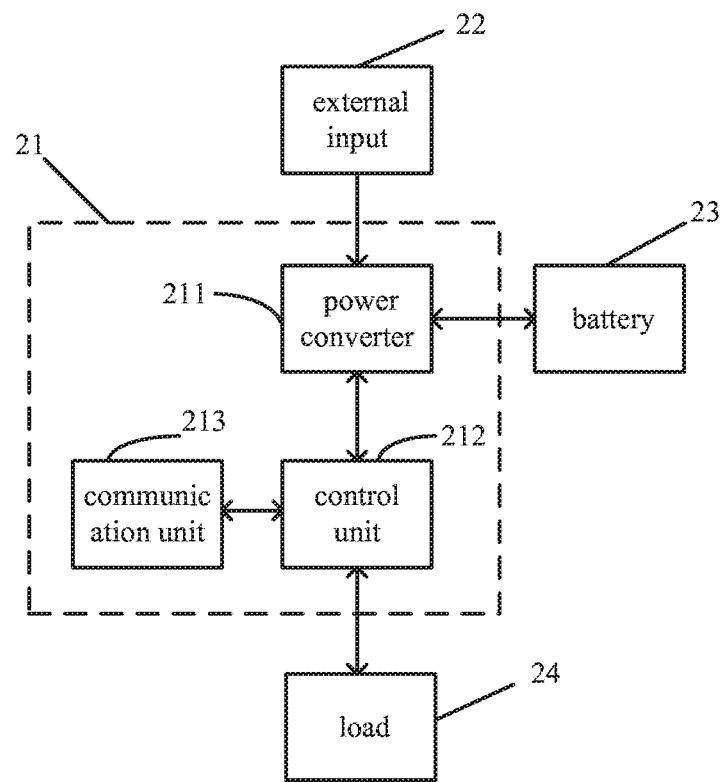
FIG. 2 is a schematic diagram of an energy intelligent terminal according to an embodiment of the present disclosure.

FIG. 2 is a schematic diagram of an energy intelligent terminal according to an embodiment of the present disclosure. As shown in FIG. 2, the energy intelligent terminal 21 of the present embodiment includes a power converter 211, a control unit 212 and a communication unit 213. The energy intelligent terminal 2 has a corresponding battery 23 and a load 24. The power converter 211 is configured to convert the voltage of the external input 22 into a charging voltage that charges the battery 23 and/or a supply voltage that powers the load. The control unit 212 is configured to acquire a corresponding set of alternative operation modes according to current energy storage of the battery 23 and switch state of the load 24 in current duty cycle, and select an alternative operation mode according to mode probability distribution and control, according to a received instruction, the energy intelligent terminal 21 to operate in accordance with the operation mode to which the instruction corresponds in the next duty cycle. The communication unit 213 is configured to communicate with other energy intelligent terminals. The energy intelligent terminal may include the following operation states:

| | load state | current energy storage e | set of alternative operation modes V |
|---|---|---|---|
| case 1 | working state | e < Pc * T | V = {Pc, Pc + Ps} |
| case 2 | working state | e > C − Ps * T | V = {0, Pc} |
| case 3 | working state | Pc * T < e < C − Ps * T | V = {0, Pc, Pc + Ps} |

-continued

| | load state | current energy storage e | set of alternative operation modes V |
|---|---|---|---|
| case 4 | disconnection state | e > C − Ps * T | V = {0} |
| case 5 | disconnection state | e < C − Ps * T | V = {0, Ps} | where e is the current energy storage of the corresponding battery, C is the energy storage capacity of the corresponding battery, Pc is the energy consumption power of the corresponding load, T is the duty cycle, and Ps is the energy storage power of the corresponding battery.

Case 1: the load to which the energy intelligent terminal corresponds is in working state, and the current energy storage of the corresponding battery e<Pc*T, that is, insufficient to supply power to the load. The set of alternative operation modes V to which the energy intelligent terminal corresponds is:

$$V=\{Pc,Pc+Ps\}$$

That is to say, when the current energy storage e of the battery to which the energy intelligent terminal corresponds is insufficient to provide the energy consumption of the load in one duty cycle T, the energy intelligent terminal has two alternative operation modes. One alternative operation mode is that the energy intelligent terminal controls the external input to only supply power to the load, and the corresponding external input power is Pc in this case. The other alternative operation mode is that the energy intelligent terminal controls the external input to supply power to the load and to charge the battery simultaneously and the corresponding external input power is Pc+Ps in this case.

Case 2: the load to which the energy intelligent terminal corresponds is in working state, and the current energy storage of the corresponding battery e>C−Ps*T, that is, the current energy storage of the battery is basically full (which will exceed the energy storage capacity C of the battery if charged for one more duty cycle) and it is not required to charge the battery through the external input, and the set of alternative operation modes V to which the energy intelligent terminal corresponds is:

$$V=\{0,Pc\}$$

That is to say, when the current energy storage of the battery to which the energy intelligent terminal corresponds is basically full, the energy intelligent terminal has two alternative operation modes. One alternative operation mode is that the energy intelligent terminal controls the corresponding battery to supply power to the load, and the corresponding external input power is 0 in this case. The other alternative operation mode is that the energy intelligent terminal controls the external input to supply power to the load, and the corresponding external input power is Pc in this case.

Case 3: the load to which the energy intelligent terminal corresponds is in working state, and the current energy storage of the corresponding battery Pc*T<e<C−Ps*T, that is, the current energy storage of the battery can either supply power to the load or the battery can be charged by the external input. The set of alternative operation modes V to which the energy intelligent terminal corresponds is:

$$V=\{0,Pc,Pc+Ps\}$$

That is to say, when the current energy storage of the batter to which the energy intelligent terminal corresponds can either supply power to the load or the battery can be charged, the energy intelligent terminal has three alternative operation modes. The first alternative operation mode is that the energy intelligent terminal controls the corresponding battery to supply power to the load, and the corresponding external input power is 0 in this case. The second alternative operation mode is that the energy intelligent terminal controls the external input to supply power to the load, and the corresponding external input power is Pc in this case. The third alternative operation mode is that the energy intelligent terminal controls the external input to supply power to the load and to charge the battery simultaneously, and the corresponding external input power is Pc+Ps in this case.

Case 4: the load to which the energy intelligent terminal corresponds is in disconnection state, and the current energy storage of the corresponding battery e>C−Ps*T, that is, the current energy storage of the battery is basically full and it is not required to charge the battery through the external input. The set of alternative operation modes V to which the energy intelligent terminal corresponds is:

$$V=\{0\}$$

That is to say, when the load does not consume energy and the current energy storage of the battery is basically full, the energy intelligent terminal has one alternative operation mode, that is, controlling the external input to neither supply power to the load nor charge the battery, and the corresponding external input power is 0 in this case.

Case 5: the load to which the energy intelligent terminal corresponds is in disconnection state, and the current energy storage of the corresponding battery e<C−Ps*T, that is, the battery can be charged. The set of alternative operation modes V to which the energy intelligent terminal corresponds is:

$$V=\{0,Ps\}$$

That is to say, when the load does not consume energy and the battery can be continued to be charged, the energy intelligent terminal has two alternative operation modes. One alternative operation mode is to control the external input to neither supply power to the load nor charge the battery, and the corresponding external input power is 0 in this case. The other alternative operation mode is to control the external input to charge the battery, and the corresponding external input power is Ps in this case.

In the present embodiment, an energy intelligent terminal in the distributed energy system is randomly selected as the master node to control each energy intelligent terminal to regulate energy according to the current state of each energy intelligent terminal (i.e., the switch state of the load, current energy storage of the battery, etc.) and the target power, so as to optimize the regulation capability of the distributed energy system in real time. The regulating method is simple and improves the efficient and stability of the system.

In the present embodiment, by regulating the distributed energy system, when an energy consumption control target (i.e. a given external input total power) is set, the energy consumption object (load, battery, etc.) reasonably shares the given external input total power, so that the actual external input total power is basically in line with the energy consumption control target, which makes the distributed energy system realize the absorption of energy in situ and improve the overall efficiency and stability of distributed energy systems. At the meanwhile, the distributed energy system of the present embodiment can achieve economical optimization for the costs of system energy consumption.

Figure 3:
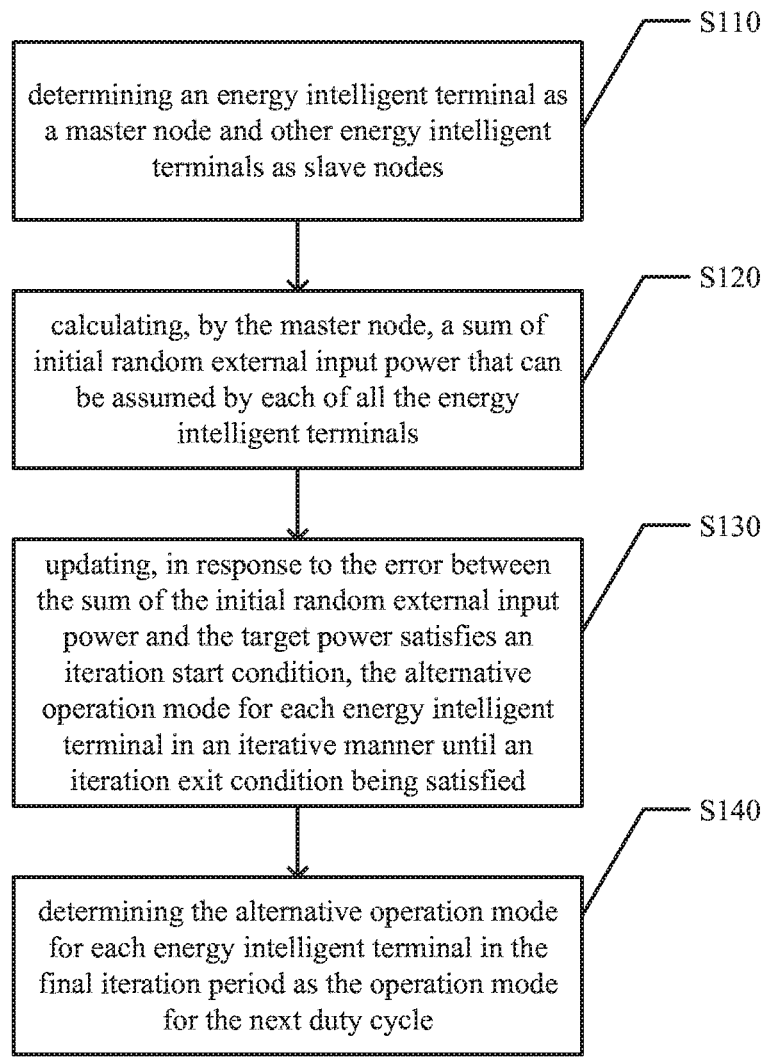
FIG. 3 is a flow chart of a control method for the distributed energy system according to an embodiment of the present disclosure.

FIG. 3 is a flow chart of a control method for the distributed energy system according to an embodiment of the present disclosure. As shown in FIG. 3, the control method for the distributed energy system of the present embodiment includes the following steps:

Step S110, determining an energy intelligent terminal as a master node and other energy intelligent terminals as slave nodes. In one embodiment, the master node is randomly selected in the distributed energy system so that the master nodes in different duty cycles may be different, thereby avoiding the system being paralyzed due to the damage of the master node, which improves the stability of the system.

Step S120, calculating, by the master node, a sum of initial random external input power that can be assumed by each of all the energy intelligent terminals. The initial random external input power is obtained from initial alternative operation mode randomly selected by each energy intelligent terminal. Each energy intelligent terminal randomly selects the initial alternative operation mode from the set of alternative operation modes to which its current state corresponds according to an initial mode probability distribution.

After a duty cycle coming to an end, each energy intelligent terminal randomly selects the initial alternative operation mode from the set of alternative operation modes to which its current state corresponds according to the initial mode probability distribution, wherein the initial mode probability distribution is determined by the number of items in the corresponding set of alternative operation modes. In one embodiment, the initial mode probability for each alternative operation mode in the set of alternative operation modes is identical. For example, when there are two alternative operation modes in the set of alternative operation modes, the initial mode probability for each of the alternative operation modes is ½.

In one embodiment, calculating, by the master node, a sum of initial random external input power that can be assumed by each of all the energy intelligent terminals specially comprises: initiating and establishing, by the master node, a spanning tree that connects all the slave nodes in the distributed energy system, and receiving the initial random external input power that can be assumed by each energy intelligent terminal reported by each energy intelligent terminal according to the connection relationship of the spanning tree to calculate the sum of the initial random external input power that can be assumed by each of all the energy intelligent terminals. In one embodiment, the sum of the initial random external input power that can be assumed by each of all the energy intelligent terminals can be calculated by traversing the spanning tree of all the energy intelligent terminals so as to improve the efficiency of the system. It should be understood that other method that can enable the master node to calculate the sum of the initial random external input power can be applied to the present embodiment.

Figure 4:
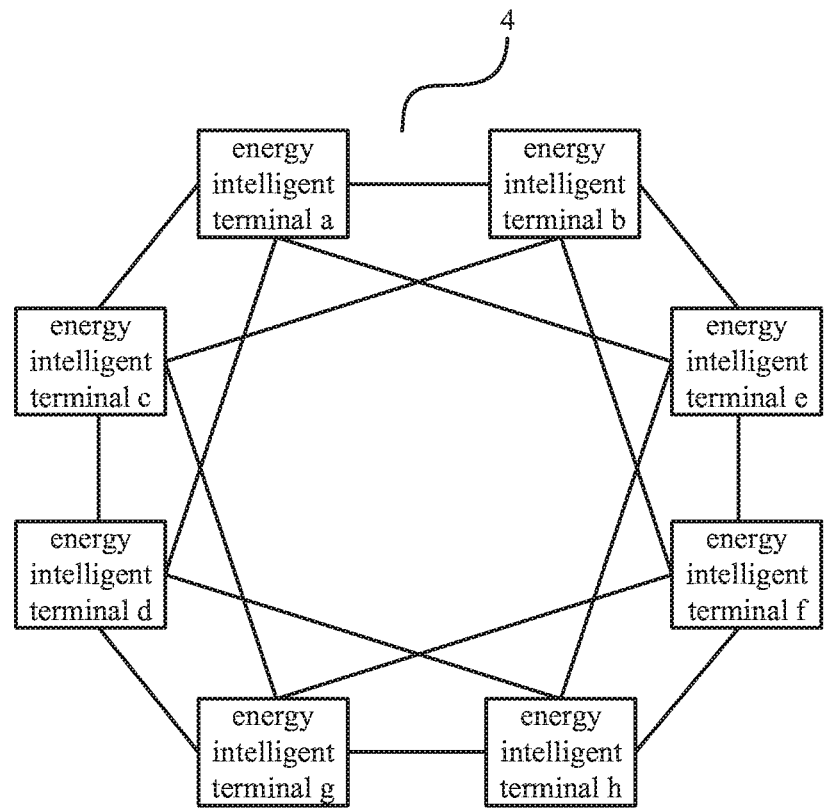
FIG. 4 is a schematic diagram of a distributed energy system according to an embodiment of the present disclosure in one implementation.

FIG. 4 is a schematic diagram of a distributed energy system according to an embodiment of the present disclosure in one implementation. As shown in FIG. 4, the distributed energy system 4 includes energy intelligent terminals a-h. In the networking of the present embodiment, the communication connections between each energy intelligent terminals are shown in FIG. 4, wherein the energy intelligent terminal a can be communicatively connected with the energy intelligent terminals b, c, d and e respectively, the energy intelligent terminal b can be communicatively connected with the energy intelligent terminals a, c, e and f respectively, the energy intelligent terminal c can be communicatively connected with the energy intelligent terminals a, b, d and g respectively, the energy intelligent terminal d can be communicatively connected with the energy intelligent terminals a, c, g and h respectively, the energy intelligent terminal e can be communicatively connected with the energy intelligent terminals a, b, f and h respectively, the energy intelligent terminal f can be communicatively connected with the energy intelligent terminals b, e, g and h respectively, the energy intelligent terminal g can be communicatively connected with the energy intelligent terminals c, d, f and h respectively and the energy intelligent terminal h can be communicatively connected with the energy intelligent terminals e, f g and d respectively. In one embodiment, the spanning tree of the distributed energy system 3 can be established by a breadth-first method.

Figure 5:
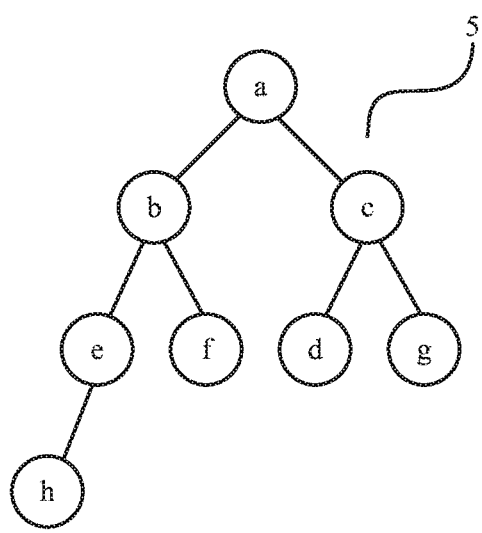
FIG. 5 is a schematic diagram of a spanning tree established by a breadth-first method according to an embodiment of the present disclosure.

FIG. 5 is a schematic diagram of a spanning tree established by a breadth-first method according to an embodiment of the present disclosure. As shown in FIG. 5, the binary tree 5 is a binary tree of the distributed energy system 4 established by the breadth-first method. Among them, the energy intelligent terminal a is selected as the master node, and the energy intelligent terminals b-h are selected as the slave nodes. It should be understood that an energy intelligent terminal can be randomly selected in the distributed energy system as the master node.

The energy intelligent terminals a-h randomly select initial alternative operation modes from the sets of alternative operation modes to which their current states correspond respectively according to the initial mode probability distribution, and gradually reports the sum of the initial random external input power of the subtrees according to the connection relationship of the binary tree 5. Specifically, the energy intelligent terminal h reports its initial random external input power Ph to the energy intelligent terminal e. The energy intelligent terminal e calculates the sum (Pe+Ph) of the initial random external input power of the subtree with itself as apex (including the energy intelligent terminals e and h) and reports the same to the energy intelligent terminal b. The energy intelligent terminal f reports its initial random external input power Pf to the energy intelligent terminal b. The energy intelligent terminal b calculates the sum (Pb+(Pe+Ph)+Pf) of the initial random external input power of the subtree with itself as apex (including the energy intelligent terminals b, e, f and h) and reports the same to the energy intelligent terminal a. Similarly, the energy intelligent terminal c reports the sum (Pc+(Pd+Pg)) of the initial random external input power of the subtree with itself as apex to the energy intelligent terminal a. The energy intelligent terminal a calculates the sum (Pa+(Pe+(Pe+Ph)+Pf)+(Pc+(Pd+Pg)))) of the initial random external input power of each of all the energy intelligent terminals a-h in the distributed energy system 4. It should be understood that each energy intelligent terminal can send its corresponding initial random external input power to the master node via other energy intelligent terminals communicatively connected thereto according to the connection relationship of the spanning tree, and the master node calculates the sum of the initial random external input power after receiving the initial random external input power that can be assumed by each of all the energy intelligent terminals. Meanwhile, the above-described traversal method based on breadth-first is merely exemplary, and methods that can initiate a spanning tree in other manners to implement the above-described function and other traversal method for the spanning tree can be applied to the present embodiment.

Step S130, updating, in response to the error between the sum of the initial random external input power that can be assumed by each of all the energy intelligent terminals in the distributed energy system and the target power satisfies an iteration start condition, the alternative operation mode for each energy intelligent terminal in an iterative manner until an iteration exit condition being satisfied. In each iteration period, the mode probability distribution to which each energy intelligent terminal corresponds is regulated and the alternative operation mode is reselected based on the regulated mode probability distribution. In one embodiment, the iteration exit condition includes the error between the sum of the random external input power and the target power in the iteration period being less than an error threshold.

Specially, the master node, in response to an initial random power difference $\Delta W0 > \varepsilon$, updates the alternative operation mode for each energy intelligent terminal in an iterative manner until the iteration exit condition is satisfied. The master node, in response to $\Delta W0 < \varepsilon$, controls each energy intelligent terminal to determine the currently selected initial alternative operation mode as the operation mode for the next duty cycle. The initial random power difference $\Delta W0$ is the error between the sum Pv0 of the initial random external input power that can be assumed by each of all the energy intelligent terminals and the target power Pth, and E is the error threshold. When the initial random power difference $\Delta W0$ satisfies the iteration condition, the sum Pv0 of the initial random external input power is taken as the sum of the random external input power in the 0th iteration.

In one embodiment, regulating the mode probability distribution to which each energy intelligent terminal corresponds in each iteration period specially comprises: the master node determining a probability indicator $\lambda$ according to the random power difference in the current iteration period and the random power difference in the previous iteration period and sending the probability indicator $\lambda$ to each energy intelligent terminal, wherein the random power difference is the error between the sum Pv(k) of the random external input power and the target power Pth, and k is the number of iterations.

In response to the probability indicator $\lambda$ being of a first state, each energy intelligent terminal calculates, according to a predetermined algorithm, a probability for the alternative operation mode to which the current iteration period corresponds and probabilities for other alternative operation modes in the corresponding set of alternative operation modes to regulate the mode probability distribution to which each energy intelligent terminal corresponds. Or, in response to the probability indicator $\lambda$ being of a second state, each energy intelligent terminal calculates, according to a predetermined algorithm, a probability for the alternative operation mode to which the previous iteration period corresponds and probabilities for other alternative operation modes in the corresponding set of alternative operation modes to regulate the mode probability distribution to which each energy intelligent terminal corresponds.

The probability indicator $\lambda$ is determined by an error probability Prob, wherein the error probability Prob satisfies the following formula:

$$Prob = \exp\left[-\frac{\max\{\Delta W(k) - \Delta W(k-1), 0\}}{L}\right]$$

where L is a simulated annealing constant that can be set according to actual situation of the distributed energy system (such as the energy consumption of the load to which the energy intelligent terminal corresponds, the energy storage capacity of the battery).

In one embodiment, the probability for the probability indicator $\lambda=1$ (i.e., the first state) is Prob, and the probability for the probability indicator $\lambda=0$ (i.e., the second state) is (1−Prob). The master node determines the state of the probability indicator $\lambda$ according to the state probability distribution (Prob, 1−Prob) of the probability indicator $\lambda$, and sends the state of the probability indicator $\lambda$ to all the energy intelligent terminals based on the spanning tree.

When the probability indictor A is of the first state ($\lambda=1$), it is characterized that the alternative operation mode selected by each energy intelligent terminal in the distributed energy system in the current iteration period is preferred, that is, the sum Pv(k) of the random external input power to which the alternative operation mode selected by each energy intelligent terminal in the current iteration period corresponds is closer to the target power Pth.

When the probability indictor A is of the second state ($\lambda=0$), it is characterized that the alternative operation mode selected by each energy intelligent terminal in the distributed energy system in the previous iteration period is preferred, that is, the sum Pv(k−1) of the random external input power to which the alternative operation mode selected by each energy intelligent terminal in the previous iteration period corresponds is closer to the target power Pth.

Each energy intelligent terminal marks the alternative operation mode selected in the current iteration period as $Pr_{j*}$ in response to the probability indicator $\lambda$ being of the first state. Each energy intelligent terminal marks the alternative operation mode selected in the previous iteration period as $Pr_{j*}$ in response to the probability indicator $\lambda$ being of the second state. In one embodiment, the mode probability distribution of each energy intelligent terminal is updated by the following formula:

$$Pr_{j*} = \min\{\gamma Pr_{j*}, 1\}$$

where $\gamma$ is update coefficient. Preferably, $\gamma=1.1$.

When the set of alternative operation modes to which the current state of the energy intelligent terminal corresponds includes two alternative operation modes, the probability for the other alternative operation mode is $Pr=1-Pr_{j*}$.

When the set of alternative operation modes to which the current state of the energy intelligent terminal corresponds includes three alternative operation modes, the probability for the other two alternative operation modes satisfies the following formulas:

$$pr_{j1} = \frac{pr_{j1}}{pr_{j1} + pr_{j2}}(1 - Pr_{j*})$$

$$pr_{j2} = \frac{pr_{j2}}{pr_{j1} + pr_{j2}}(1 - Pr_{j*})$$

Thereby, the probability that a preferred alternative operation mode is selected in each energy intelligent terminal can be improved, thereby improving the efficiency of the distributed energy system.

Each energy intelligent terminal selects the alternative operation model from the set of alternative operation modes according to regulated mode probability distribution after regulating the corresponding mode probability distribution and reports the random external input power to which the selected operation mode corresponds to the master node based on the spanning tree. The master node determines whether the error between the sum of the random external input power that can be assumed by each of all the energy intelligent terminals and the target power is less than or equal to the error threshold. If the error between the sum of the random external input power and the target power is less than or equal to the error threshold, the iteration is exited. If the error between the sum of the random external input power and the target power is larger than the error threshold, the iteration computation is continued according to the above-mentioned method until the iteration exit condition is satisfied. In another embodiment, the iteration exit condition further includes the number of iterations reaching an iteration number threshold. That is, the iteration number threshold is preset to avoid iteration calculation timeout to improve the efficiency of the distributed energy system. It should be understood that the simulated annealing method is used in the present embodiment to determine the operation mode for the next duty cycle. However, other methods capable of realizing the above functions (for example, the particle swarm method, the generalized gradient descent method, etc.) can be applied to the present embodiment.

Step 140, determining the alternative operation mode for each energy intelligent terminal in the final iteration period as the operation mode for the next duty cycle.

The iterative process for regulating the distributed energy system is described below by taking the distributed energy system 4 in FIG. 4 as an example.

Assume that the sets of alternative operation modes to which the current states of the energy intelligent terminals a-h correspond are Va={Pc, Pc+Ps}、Vb={0, Pc}、Vc={0, Pc, Pc+Ps}、Vd={0}、Ve={0, Ps}, Vf={Pc, Pc+Ps}、Vg={0, Pc}、Vh={0, Pc, Pc+Ps} respectively, then the initial mode probability distributions for the alternative operation modes in the sets of alternative operation modes to which the current states of the energy intelligent terminals a-h correspond are Pra={1/2,1/2}、Prb={1/2,1/2}、Prc={1/3,1/3, 1/3}, Prd={1}、Pre={1/2,1/2}、Prf={1/2,1/2}、Prg={1/2,1/2}、Prh={1/3,1/3、1/3} respectively. Assume that the energy consumption power Pc of the load to which each energy intelligent terminal corresponds is 2 kW, the energy storage power of the battery to which each energy intelligent terminal corresponds is 3 kW, the target power is 20 kW, and the threshold error E is 1 kW. In the present embodiment, the energy consumption power Pc of the load to which each energy intelligent terminal corresponds is identical and the energy storage power Ps of the battery to which each energy intelligent terminal corresponds is identical, which is taken as an example. It should be understood that in an actual distributed energy system, the load and battery to which each energy intelligent terminal corresponds may be different, and the corresponding energy consumption Pc and the stored energy Ps are also different.

Assume that the initial random external input power to which the initial alternative operation modes randomly selected by the energy intelligent terminals a-h are Pc、Pc、0、0、Ps、Pc+Ps、0、Pc, respectively, then the sum Pv(0) of the initial random external input power that be assumed by the energy intelligent terminals a-h is:

$$Pv(0)=Pc+Pc+0+0+Ps+(Pc+Ps)+0+Pc=14 \text{ kW}$$

Since $\Delta W(0)=|Pv(0)-Pth|=|14 \text{ kW}-20 \text{ kW}|=6 \text{ kW} > \varepsilon$, the energy intelligent terminals a-h are controlled to update the corresponding alternative operation modes in an iterative manner until the iteration exit condition is satisfied. The sum of the initial random external input power Pv(0)=14 kW is used as the sum of the random external input power in the 0th iteration.

Specifically, when the initial random power difference ΔW(0)=6 kW>ε=1 kW, the master node (energy intelligent terminal a) delivers an instruction that the iteration will be performed to each slave node (energy intelligent terminals b-h) based on the binary tree 5.

In the 1st iteration period, the energy intelligent terminals a-h still select the alternative operation modes from the sets of alternative operation modes to which their current states correspond according to the corresponding initial mode probability distributions. If, in the 1st iteration period, the random external input power to which the alternative operation modes randomly selected by the energy intelligent terminals a-h are Pc、0、Pc+Ps、0、Ps、Pc、0 Pc+Ps、 respectively, the sum Pv(1) of the random external input power that can be assumed by the energy intelligent terminals a-h in the 1st iteration period is: Pv(1)=Pc+0+(Pc+Ps)+0+Ps+Pc+0+(Pc+Ps)=17 kW.

The random power difference ΔW(1) in the 1st iteration period is: ΔW(1)=|Pv(1)−Pth|=|17 kW−20 kW|=3 kW>ε=1 kW. Therefore, the random power difference in the 1st iteration period does not satisfy the iteration exit condition and the 2nd iteration period is started.

The probability indictor λ is determined according to the error probability Prob:

$$Prob = \exp\left[-\frac{\max\{\Delta W(k) - \Delta W(k-1), 0\}}{L}\right]$$
$$= \exp\left[-\frac{\max\{\Delta W(1) - \Delta W(0), 0\}}{L}\right]$$
$$= \exp\left[-\frac{\max\{3-6, 0\}}{L}\right] = 1$$

Therefore, the probability for the probability indicator λ being of the first state (λ=1) is 1, and the probability for the probability indicator λ being of the second state (λ=0) is 0. Thereby, the master node (energy intelligent terminal a) sends an instruction that the probability indictor λ is of the first state to each slave node (energy intelligent terminal b-h) based on the spanning tree.

The energy intelligent terminals a-h, in response to that the probability indicator λ being of the first state, calculate probabilities for the alternative operation modes to which the 1st iteration period corresponds and probabilities for other alternative operation modes in the sets of alternative operation modes according to a predetermined algorithm to regulate the mode probability distribution to which each energy intelligent terminal corresponds.

The regulated mode probability distributions for the energy intelligent terminals a-h obtained through the algorithm (update coefficient γ=1.1) used by the energy intelligent terminals for regulating the corresponding mode probability distributions are: Pra={0.55,0.45}、Prb={0.55,0.45}、Prc={19/60,19/60,11/30}、Prd={1}、Pre={0.45,0.55}、Prf={0.55,0.45}、Prg={0.55,0.45}、Prh={19/60,19/60,11/30}.

The energy intelligent terminals a-h select the alternative operation modes from the sets of alternative operation modes to which their current states correspond according to the regulated mode probability distributions respectively. If the random external input power to which the alternative operation modes randomly selected by the energy intelligent terminals a-h are Pc、Pc、Pc+Ps、0、Ps、Pc、0、Pc+Ps respectively, the sum Pv(2) of the random external input power that can be assumed by the energy intelligent terminals a-h obtained in the 2nd iteration period according to the updated alternative operation modes is: Pv(2)=Pc+Pc+(Pc+Ps)+0+Ps+Pc+0+(Pc+Ps)=19 kW. The random power difference ΔW=|Pv(2)−Pth|=|19 kW−20 kW|=1 kW=ε at this time, which thus satisfies the iteration exit condition that the random power difference is less than or equal to the error threshold, and the master node (energy intelligent terminal a) sends an instruction that the iteration is exited to each slave node (energy intelligent terminals b-h) based on the spanning tree to determine the alternative operation mode to which the final iteration period corresponds (i.e., the alternative operation mode to which the sum Pv(2) of the random external input power in the 2nd iteration period corresponds) as the operation mode for the next duty cycle. That is, the energy intelligent terminals a-h use the alternative operation modes to which the random external input power Pc、Pc、Pc+Ps、0、Ps、Pc、0、Pc+Ps correspond as the operation modes for the next duty cycle respectively. It should be understood that, assuming that the sum Pv(2) of the random external input power of the energy intelligent terminals a-h obtained in the alternative operation mode to which the 2nd iteration period corresponds does not satisfy the iterative exit condition, the output Pv(2) in the second iteration period is used as an input for the 3rd iteration period to continue the iteration operation.

Therefore, the distributed energy system of the present embodiment can flexibly perform energy regulation in real time, which greatly improves the efficiency of the system.

At the meanwhile, each of the energy intelligent terminals of the present embodiment corresponds to a load, which can better adapt to on-site requirements of modern distributed energy regulation, and can be applied to the energy regulation for single or multiple types of loads in cooling and heating systems, lighting systems, power systems and so on in building construction. The regulating method is simple, real-time strong, and high robustness and the system has ad hoc network capability with the characteristics of fast deployment and plug and play terminals.

According to the present embodiment, it determines the error between a sum of initial random external input power that can be assumed by each of all the energy intelligent terminals and target power, updates the alternative operation mode for each energy intelligent terminal in an iterative manner when the error satisfies an iteration start condition until an iteration exit condition being satisfied, and determines the alternative operation mode for each energy intelligent terminal in the final iteration period as the operation mode for next duty cycle so as to regulate operation mode of the distributed energy system in real time according to the target power and energy consumption power of load to which each energy intelligent terminal corresponds. The regulating method is simple and improves the efficient and stability of the distributed energy system.

In one embodiment, the control method for the distributed energy system further includes: the master node calculating a sum of maximal external input power that can be assumed by each of all the energy intelligent terminals, and determining, in response to the sum of maximal external input power that can be assumed by each of all the energy intelligent terminals being less than or equal to the target power, the alternative operation mode corresponding to the maximum external input power for each energy intelligent terminal as the operation mode for the next duty cycle.

In one embodiment, the control method for the distributed energy system further includes: the master node calculating a sum of minimal external input power that can be assumed by each of all the energy intelligent terminals, and determining, in response to the sum of minimal external input power that can be assumed by each of all the energy intelligent terminals being larger than or equal to the target power, the alternative operation mode corresponding to the minimal external input power for each energy intelligent terminal as the operation mode for the next duty cycle.

In one embodiment, each energy intelligent terminal can report its maximal external input power or minimal external input power to the master node based on the spanning tree initiated by the master node or in other manner according to the instruction of the master node.

In one embodiment, the sum of the maximal external input power and the sum of the minimal external input power that can be assumed by each of all the energy intelligent terminals can be judged before judging the sum of the initial random external input power that can be assumed by each of all the energy intelligent terminals to improve the energy regulation efficiency of the system.

Figure 6:
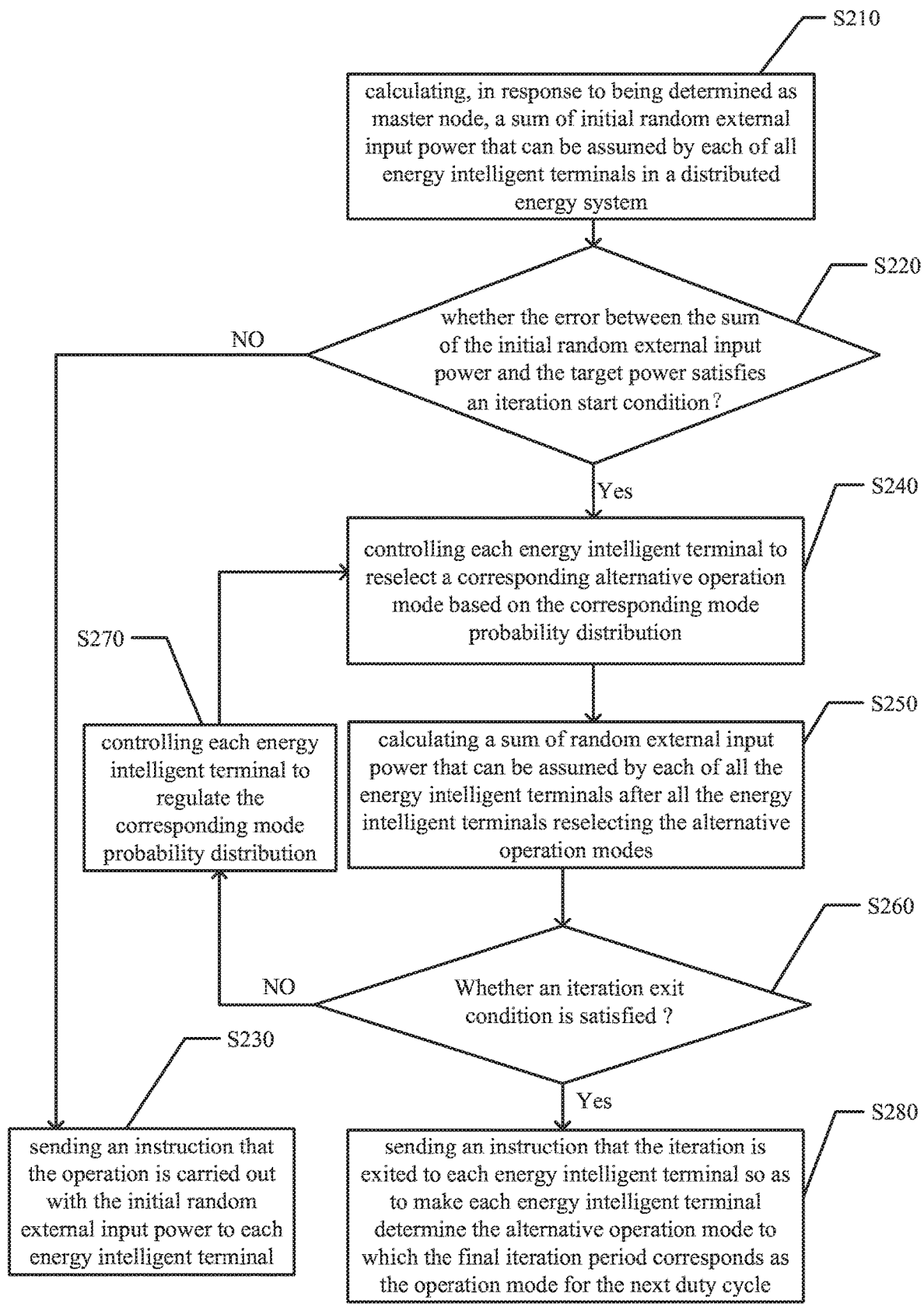
FIG. 6 is a flow chart of a control method for the energy intelligent terminal according to an embodiment of the present disclosure.

In this embodiment, the distributed energy system can be regulated in real time when the external input power is given, so that the sum of the external input power required by the system does not exceed the target power while satisfying load demands, thereby improving the efficiency of the system FIG. 6 is a flowchart of a control method for an energy intelligent terminal according to an embodiment of the present disclosure. As shown in FIG. 6, the control method for the energy intelligent terminal according to the embodiment of the present disclosure includes the following steps:

Step S210: calculating, in response to being determined as master node, a sum of initial random external input power that can be assumed by each of all energy intelligent terminals in a distributed energy system, and the initial random external input power being obtained from initial alternative operation mode randomly selected by each energy intelligent terminal, wherein each energy intelligent terminal randomly selects the initial alternative operation mode from the set of alternative operation modes to which its current state corresponds according to an initial mode probability distribution.

In the present embodiment, the initial mode probability distribution for each energy intelligent terminal is determined by the number of items in the corresponding set of alternative operation modes, wherein the initial mode probability for each alternative operation mode in the set of alternative operation modes is identical.

In one embodiment, calculating the sum of the initial random external input power that can be assumed by each of all energy intelligent terminals in the distributed energy system specially includes:

initiating and establishing, in response to being determined as the master node, a spanning tree that connects other energy intelligent terminals in the distributed energy system; and receiving, by the master node, a sum of the initial random external input power that can be assumed by subtrees to which each energy intelligent terminal gradually reports according to the connection relationship of the spanning tree so as to calculate the sum of the initial random external input power that can be assumed by each of all the energy intelligent terminals in the distributed energy system. Therefore, the efficiency of calculating the sum of the initial random external input power can be improved and the networking of the distributed energy system is easy and flexible.

Step S220, determining whether the error between the sum of the initial random external input power that can be assumed by each of all the energy intelligent terminals and the target power satisfies an iteration start condition. In one embodiment, the iteration start condition may specifically be that the error between the sum of the initial random external input power that can be assumed by each of all the energy intelligent terminals and the target power is larger than an error threshold. In response to that the error between the sum of the initial random external input power that can be assumed by each of all the energy intelligent terminals and the target power does not satisfy the iteration start condition, step S230 is performed. In response to that the error between the sum of the initial random external input power that can be assumed by each of all the energy intelligent terminals and the target power satisfies the iteration start condition, step S240 is performed.

Step S230, sending an instruction that the operation is carried out with the initial random external input power to each energy intelligent terminal. Each energy intelligent terminal is controlled by the instruction to use the initial alternative operation mode as the operation mode for the next duty cycle.

Step S240, controlling each energy intelligent terminal to reselect a corresponding alternative operation mode based on the corresponding mode probability distribution. Wherein, in the 1st iteration period, the mode probability distribution to which each energy intelligent terminal corresponds is the initial mode probability distribution. In the kth (k>1) iteration period, each energy intelligent terminal is controlled by the instruction of the master node to calculate according to a predetermined algorithm to obtain a corresponding mode probability distribution.

Step S250: calculating a corresponding sum of random external input power after all the energy intelligent terminals in the distributed energy system reselecting the alternative operation modes.

Step S260, determining whether an iteration exit condition is satisfied. In one embodiment, the iteration exit condition includes the error between the sum of the random external input power and the target power being less than the error threshold. In another embodiment, the iteration exit condition further includes the number of iterations reaching an iteration number threshold. That is, the iteration number threshold is preset to avoid iteration calculation timeout to improve the efficiency of the distributed energy system. That is to say, the iteration is exited in response to the error between the sum of the random external input power and the target power being less than the error threshold or the number of iterations reaching the iteration number threshold. In response to the iteration exit condition being not satisfied, step S270 is performed. In response to the iteration exit condition being satisfied, step S280 is performed.

Step S270, controlling each energy intelligent terminal to regulate the corresponding mode probability distribution. Specially, the master node determines a probability indicator according to the random power difference in the current iteration period and the random power difference in the previous iteration period, and sends the probability indicator to control each energy intelligent terminal to regulate the corresponding mode probability distribution according to the probability indicator, and updates the corresponding alternative operation mode based on the corresponding mode probability distribution, wherein the random power difference is the error between the sum of the random external input power that can be assumed by each of all the energy intelligent terminals and the target power.

Step S280: sending an instruction that the iteration is exited to each energy intelligent terminal so as to make each energy intelligent terminal determine the alternative operation mode to which the final iteration period corresponds as the operation mode for the next duty cycle.

In one embodiment, the control method for the energy intelligent terminal further includes: calculating, in response to being determined as the master node, a sum of maximal external input power that can be assumed by each of all the energy intelligent terminals in the distributed energy system, and sending an instruction that the operation is carried out with the maximal external input power in response to the sum of maximal external input power that can be assumed by each of all the energy intelligent terminals being less than or equal to the target power. That is to say, in response to the sum of maximal external input power that can be assumed by each of all the energy intelligent terminals being less than or equal to the target power, the master node controls each energy intelligent terminal to select the alternative operation mode corresponding to the maximum external input power as the operation mode for the next duty cycle.

In one embodiment, the control method for the energy intelligent terminal of the present embodiment further includes: calculating, in response to being determined as the master node, a sum of minimal external input power that can be assumed by each of all the energy intelligent terminals in the distributed energy system, and sending an instruction that the operation is carried out with the minimal external input power in response to the sum of minimal external input power that can be assumed by each of all the energy intelligent terminals being larger than or equal to the target power. That is to say, in response to the sum of minimal external input power that can be assumed by each of all the energy intelligent terminals being larger than or equal to the target power, the master node controls each energy intelligent terminal to select the alternative operation mode corresponding to the minimal external input power as the operation mode for the next duty cycle. It is easy to understand that the master node can calculate the sum of the maximal external input power and the sum of the minimum external input power that can be assumed by each of all the energy intelligent terminals based on the spanning tree.

According to the present embodiment, it determines the error between a sum of initial random external input power that can be assumed by each of all the energy intelligent terminals and target power, updates the alternative operation mode for each energy intelligent terminal in an iterative manner when the error satisfies an iteration start condition until an iteration exit condition being satisfied, and determines the alternative operation mode for each energy intelligent terminal in the final iteration period as the operation mode for next duty cycle so as to regulate operation mode of the distributed energy system in real time according to the target power and energy consumption power of load to which each energy intelligent terminal corresponds. The regulating method is simple and improves the efficient and stability of the distributed energy system. At the meanwhile, the system has ad hoc network capability with the characteristics of fast deployment and plug and play terminals.

Figure 7:
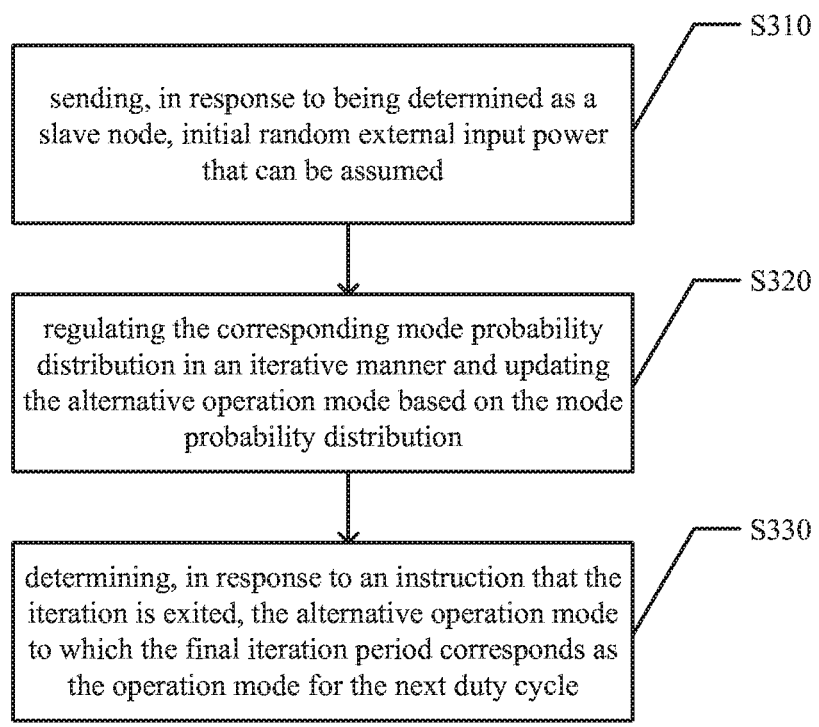
FIG. 7 is a flow chart of another control method for the energy intelligent terminal according to an embodiment of the present disclosure.

FIG. 7 is a flowchart of another control method for an energy intelligent terminal according to an embodiment of the present disclosure. As shown in FIG. 7, the control method for the energy intelligent terminal according to the embodiment of the present disclosure includes the following steps:

Step S310, sending, in response to being determined as a slave node, initial random external input power that can be assumed, wherein the initial random external input power is obtained from initial alternative operation mode randomly selected by the energy intelligent terminal. The energy intelligent terminal randomly selects the initial alternative operation mode from the set of alternative operation modes to which its current state corresponds according to an initial mode probability distribution.

The initial mode probability distribution for the energy intelligent terminal is determined by the number of items in the corresponding set of alternative operation modes, wherein the initial mode probability for each alternative operation mode in the set of alternative operation modes is identical.

Step S320, regulating the corresponding mode probability distribution in an iterative manner and updating the alternative operation mode based on the mode probability distribution.

Specially, the slave node calculates, in response to probability indicator being of a first state, a probability for the alternative operation mode to which current iteration period corresponds and probabilities for other alternative operation modes in the corresponding set of alternative operation modes according to a predetermined algorithm to regulate the corresponding mode probability distribution and updates the alternative operation mode based on the regulated mode probability distribution.

The slave node calculates, in response to the probability indicator being of a second state, a probability for the alternative operation mode to which previous iteration period corresponds and probabilities for other alternative operation modes in the corresponding set of alternative operation modes according to a predetermined algorithm to regulate the corresponding mode probability distribution and updates the alternative operation mode based on the regulated mode probability distribution.

Step S330, determining, in response to an instruction that the iteration is exited, the alternative operation mode to which the final iteration period corresponds as the operation mode for the next duty cycle.

In one embodiment, the control method for the energy intelligent terminal in the present embodiment further includes: using the initial alternative operation mode as the alternative operation mode for the next duty cycle in response to an instruction that the operation is carried out with the initial random external input power.

In one embodiment, the control method for the energy intelligent terminal in the present embodiment further includes: sending, in response to being determined as a slave node, maximal external input power that can be assumed. The slave node determines, in response to an instruction that the operation is carried out with the maximal external input power, the alternative operation mode corresponding to the maximal external input power as the operation mode for the next duty cycle.

In one embodiment, the control method for the energy intelligent terminal in the present embodiment further includes: sending, in response to being determined as a slave node, minimal external input power that can be assumed. The slave node determines, in response to an instruction that the operation is carried out with the minimal external input power, the alternative operation mode corresponding to the minimal external input power as the operation mode for the next duty cycle.

According to the present embodiment, it determines the error between a sum of initial random external input power that can be assumed by each of all the energy intelligent terminals and target power, updates the alternative operation mode for each energy intelligent terminal in an iterative manner when the error satisfies an iteration start condition until an iteration exit condition being satisfied, and determines the alternative operation mode for each energy intelligent terminal in the final iteration period as the operation mode for next duty cycle so as to regulate operation mode of the distributed energy system in real time according to the target power and energy consumption power of load to which each energy intelligent terminal corresponds. The regulating method is simple and improves the efficient and stability of the distributed energy system. Moreover, the distributed energy system according to the embodiments of the present disclosure has ad hoc network capability with the characteristics of fast deployment and plug and play terminals.

The foregoing descriptions are merely preferred embodiments of the present disclosure, and are not intended to limit the present disclosure. For those skilled in the art, the present disclosure may have various modifications and variations. Any modification, equivalent replacement, improvement and the like made within the spirit and principle of the present disclosure should be incorporated in the protection scope of the present disclosure.

The invention claimed is:

1. A control method for a distributed energy system, wherein the distributed energy system comprises multiple energy intelligent terminals connected through a network, and the energy intelligent terminal supplies power to a corresponding load based on a battery or an external input and/or charges the battery through the external input, the energy intelligent terminal has a corresponding set of alternative operation modes in different operation states, and different alternative operation modes in the set of alternative operation modes assume corresponding external input power, the control method comprises:
   determining an energy intelligent terminal as a master node and other energy intelligent terminals as slave nodes;
   calculating, by the master node, a sum of initial random external input power that can be assumed by each of all the energy intelligent terminals, and the initial random external input power being obtained from initial alternative operation mode randomly selected by each energy intelligent terminal, wherein each energy intelligent terminal randomly selects the initial alternative operation mode from the set of alternative operation modes to which its current state corresponds according to an initial mode probability distribution;
   updating, in response to the error between the sum of the initial random external input power and target power satisfying an iteration start condition, the alternative operation mode for each energy intelligent terminal in an iterative manner until an iteration exit condition being satisfied, wherein the iteration exit condition comprises the error between the sum of the initial random external input power and the target power in the iteration period being less than or equal to an error threshold; and
   determining the alternative operation mode for each energy intelligent terminal in the final iteration period as the operation mode for next duty cycle,
   wherein, in each iteration period, the mode probability distribution to which each energy intelligent terminal corresponds is regulated and the alternative operation mode is reselected based on the regulated mode probability distribution.

2. The control method according to claim 1, wherein the control method further comprises:
   calculating, by the master bode, a sum of maximal external input power that can be assumed by each of all the energy intelligent terminals; and
   determining, in response to the sum of maximal external input power being less than or equal to the target power, the alternative operation mode for each energy intelligent terminal corresponding to the maximal external input power as the operation mode for the next duty cycle.

3. The control method according to claim 1, wherein the control method further comprises:
   calculating, by the master node, a sum of minimal external input power that can be assumed by each of all the energy intelligent terminals; and
   determining, in response to the sum of minimal external input power being larger than or equal to the target power, the alternative operation mode for each energy intelligent terminal corresponding to the minimal external input power as the operation mode for the next duty cycle.

4. The control method according to claim 1, wherein the initial mode probability distribution for each energy intelligent terminal is determined by the number of items in the corresponding set of alternative operation modes; and
   wherein the initial mode probability for each alternative operation mode in the set of alternative operation modes is identical.

5. The control method according to claim 1, wherein, in each iteration period, regulating the mode probability distribution to which each energy intelligent terminal corresponds comprises:
   determining, by the master node, a probability indicator according to random power difference in current iteration period and random power difference in previous iteration period, and sending the probability indicator to each energy intelligent terminal, wherein the random power difference is the error between the sum of the random external input power and the target power;
   calculating, by each energy intelligent terminal in response to the probability indicator being of a first state, a probability for the alternative operation mode to which the current iteration period corresponds and probabilities for other alternative operation modes in the corresponding set of alternative operation modes according to a predetermined algorithm to regulate the mode probability distribution to which each energy intelligent terminal corresponds; and
   calculating, by each energy intelligent terminal in response to the probability indicator being of a second state, a probability for the alternative operation mode to which the previous iteration period corresponds and probabilities for other alternative operation modes in the corresponding set of alternative operation modes according to a predetermined algorithm to regulate the mode probability distribution to which each energy intelligent terminal corresponds.

6. The control method according to claim 1, wherein the iteration exit condition further comprises that the number of iterations reaches an iteration number threshold.

7. The control method according to claim 1, wherein calculating, by the master node, a sum of initial random external input power that can be assumed by each of all the energy intelligent terminals comprises:

initiating and establishing, by the master node, a spanning tree that connects all the slave nodes in the distributed energy system; and receiving, by the master node, a sum of the initial random external input power that can be assumed by subtrees to which each energy intelligent terminal gradually reports according to the connection relationship of the spanning tree so as to calculate the sum of initial random external input power that can be assumed by each of all the energy intelligent terminals.

8. A control method for an energy intelligent terminal, wherein the energy intelligent terminal supplies power to a corresponding load based on a battery or an external input and/or charges the battery through the external input, the energy intelligent terminal has a corresponding set of alternative operation modes in different operation states, and different alternative operation modes in the set of alternative operation modes assume corresponding external input power, the control method comprises:

calculating, in response to being determined as a master node, a sum of initial random external input power that can be assumed by each of all energy intelligent terminals in a distributed energy system, and the initial random external input power being obtained from initial alternative operation mode randomly selected by each energy intelligent terminal, wherein each energy intelligent terminal randomly selects the initial alternative operation mode from the set of alternative operation modes to which its current state corresponds according to an initial mode probability distribution;

controlling, in response to the error between the sum of initial random external input power and target power satisfying an iteration start condition, each energy intelligent terminal to update the corresponding alternative operation mode in an iterative manner until an iteration exit condition being satisfied, wherein the iteration exit condition comprises the error between the sum of the random external input power and the target power in the iteration period being less than an error threshold; and sending an instruction that the iteration is exited to each energy intelligent terminal so as to make each energy intelligent terminal determine the alternative operation mode to which the final iteration period corresponds as the operation mode for next duty cycle, wherein, in each iteration period, each energy intelligent terminal is controlled to regulate the corresponding mode probability distribution and the alternative operation mode is reselected based on the regulated mode probability distribution.

9. The control method according to claim 8, wherein the control method further comprises:

calculating, in response to being determined as the master node, a sum of maximal external input power that can be assumed by each of all the energy intelligent terminals in the distributed energy system; and sending an instruction that the operation is carried out with the maximal external input power in response to the sum of maximal external input power being less than or equal to the target power.

10. The control method according to claim 8, wherein the control method further comprises:

calculating, in response to being determined as the master node, a sum of minimal external input power that can be assumed by each of all the energy intelligent terminals in the distributed energy system; and sending an instruction that the operation is carried out with the minimal external input power in response to the sum of minimal external input power being larger than or equal to the target power.

11. The control method according to claim 8, wherein the initial mode probability distribution for each energy intelligent terminal is determined by the number of items in the corresponding set of alternative operation modes; and wherein the initial mode probability for each alternative operation mode in the set of alternative operation modes is identical.

12. The control method according to claim 8, wherein, in each iteration period, controlling each energy intelligent terminal to regulate the corresponding mode probability distribution comprises:

determining a probability indicator according to random power difference in current iteration period and random power difference in previous iteration period, and sending the probability indicator to control each energy intelligent terminal to regulate the corresponding mode probability distribution according to the probability indicator, wherein the random power difference is the error between the sum of the random external input power and the target power.

13. The control method according to claim 8, wherein the iteration exit condition further comprises that the number of iterations reaches an iteration number threshold.

14. The control method according to claim 8, wherein, calculating, in response to being determined as the master node, a sum of initial random external input power that can be assumed by each of all the energy intelligent terminals in the distributed energy system comprises:

initiating and establishing, in response to being determined as the master node, a spanning tree that connects other energy intelligent terminals in the distributed energy system; and receiving a sum of the initial random external input power that can be assumed by subtrees to which each energy intelligent terminal gradually reports according to the connection relationship of the spanning tree so as to calculate the sum of the initial random external input power of each of all the energy intelligent terminals in the distributed energy system.

15. A control method for an energy intelligent terminal, wherein the energy intelligent terminal supplies power to a corresponding load based on a battery or an external input and/or charges the battery through the external input, the energy intelligent terminal has a corresponding set of alternative operation modes in different operation states, and different alternative operation modes in the set of alternative operation modes assume corresponding external input power, the control method comprises:

sending, in response to being determined as a slave node, initial random external input power that can be assumed, and the initial random external input power being obtained from initial alternative operation mode randomly selected by the energy intelligent terminal, wherein the energy intelligent terminal randomly selects the initial alternative operation mode from the set of alternative operation modes to which its current state corresponds according to an initial mode probability distribution;

updating the alternative operation mode in an iterative manner; and determining, in response to an instruction that the iteration is exited, the alternative operation mode to which the final iteration period corresponds as the operation mode for next duty cycle;

wherein in each iteration period, the corresponding mode probability distribution is regulated and the alternative operation mode is reselected based on the regulated mode probability distribution.

16. The control method according to claim 15, wherein the control method further comprises:

sending, in response to being determined as the slave node, maximal external input power that can be assumed; and determining, in response to an instruction that the operation is carried out with the maximal external input power, the alternative operation mode corresponding to the maximal external input power as the operation mode for the next duty cycle.

17. The control method according to claim 15, wherein the control method further comprises:

sending, in response to being determined as the slave node, minimal external input power that can be assumed; and determining, in response to an instruction that the operation is carried out with the minimal external input power, the alternative operation mode corresponding to the minimal external input power as the operation mode for the next duty cycle.

18. The control method according to claim 15, wherein the initial mode probability distribution for the energy intelligent terminal is determined by the number of items in the corresponding set of alternative operation modes; and wherein the initial mode probability for each alternative operation mode in the set of alternative operation modes is identical.

19. The control method according to claim 15, wherein, in each iteration period, regulating the corresponding mode probability distribution comprises:

calculating, in response to a probability indicator being of a first state, a probability for the alternative operation mode to which current iteration period corresponds and probabilities for other alternative operation modes in the corresponding set of alternative operation modes according to a predetermined algorithm to regulate the corresponding mode probability distribution; and calculating, in response to the probability indicator being of a second state, a probability for the alternative operation mode to which previous iteration period corresponds and probabilities for other alternative operation modes in the corresponding set of alternative operation modes according to a predetermined algorithm to regulate the corresponding mode probability distribution.

* * * * *